United States Patent
Schubilske

(10) Patent No.: US 9,315,323 B2
(45) Date of Patent: Apr. 19, 2016

(54) ORDER FULFILLMENT TECHNIQUE

(71) Applicant: Dematic Corp, Grand Rapids, MI (US)

(72) Inventor: Martin E. Schubilske, Brookfield, WI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 14/817,580

(22) Filed: Aug. 4, 2015

(65) Prior Publication Data

US 2016/0031644 A1    Feb. 4, 2016

Related U.S. Application Data

(60) Provisional application No. 62/032,920, filed on Aug. 4, 2014.

(51) Int. Cl.
| | |
|---|---|
| *G06F 7/00* | (2006.01) |
| *B65G 1/137* | (2006.01) |
| *G05B 15/02* | (2006.01) |

(52) U.S. Cl.
CPC .............. *B65G 1/1376* (2013.01); *G05B 15/02* (2013.01)

(58) Field of Classification Search
None
See application file for complete search history.

(56) References Cited

U.S. PATENT DOCUMENTS

| | | | |
|---|---|---|---|
| 4,518,302 | A | 5/1985 | Knapp |
| 5,395,206 | A | 3/1995 | Cerny, Jr. |
| 6,011,998 | A | 1/2000 | Lichti et al. |
| 6,289,260 | B1 | 9/2001 | Bradley et al. |
| 6,505,093 | B1 | 1/2003 | Thatcher et al. |
| 7,363,104 | B2 | 4/2008 | Stevens |
| 8,170,712 | B2 | 5/2012 | Battles et al. |
| 8,327,609 | B2 | 12/2012 | Krizmanic et al. |

(Continued)

FOREIGN PATENT DOCUMENTS

| | | |
|---|---|---|
| DE | 29912230 U1 | 12/1999 |
| DE | 10234150 A1 | 5/2003 |

(Continued)

OTHER PUBLICATIONS

Commonly assigned co-pending U.S. Appl. No. 14/755,580, filed Jun. 30, 2015, entiltled LIFT Configuration for Carriage-Based Warehouse.

(Continued)

*Primary Examiner* — Yolanda Cumbess
(74) *Attorney, Agent, or Firm* — Gardner, Linn, Burkhart & Flory, LLP

(57) ABSTRACT

A method and apparatus for fulfilling orders with a system having an automated warehouse that is adapted to store a plurality of inventory receptacles. The automated warehouse includes a plurality of vehicles that are adapted to storing inventory receptacles and retrieving inventory receptacles and an outbound device that is adapted to exchanging inventory receptacles between a pick station and the vehicles. Orders of items are received with an order queue. Orders are disbursed from the order queue to a vehicle queue associated with each vehicle. Inventory receptacles are retrieved with the vehicles having items for at least one of the orders. The inventory receptacles are retrieved according to the vehicle queue for that vehicle. Inventory receptacles are deposited by the vehicles to an outbound queue associated with the outbound device and forwarded from the outbound device to the pick station according to the requirements of the pick station. Items are retrieved from the product receptacles at the pick station and put into transportation receptacles.

21 Claims, 7 Drawing Sheets

(56) References Cited

U.S. PATENT DOCUMENTS

| | | |
|---|---|---|
| 8,335,585 B2 | 12/2012 | Hansl et al. |
| 8,682,474 B2 | 3/2014 | Rotella et al. |
| 8,718,814 B1 | 5/2014 | Clark et al. |
| 8,855,806 B2 | 10/2014 | Hara et al. |
| 8,892,240 B1 | 11/2014 | Vliet et al. |
| 8,952,284 B1 | 2/2015 | Wong et al. |
| 8,974,168 B2 | 3/2015 | Yamashita |
| 9,014,844 B2 | 4/2015 | Casey et al. |
| 2005/0008463 A1 | 1/2005 | Stehr et al. |
| 2005/0238465 A1* | 10/2005 | Razumov .......... A47F 10/02 414/273 |
| 2006/0182543 A1 | 8/2006 | Schaefer |
| 2009/0208313 A1* | 8/2009 | Hayashi .......... G06Q 10/08 414/222.02 |
| 2011/0008137 A1 | 1/2011 | Yamashita |
| 2011/0295413 A1 | 12/2011 | Hara et al. |
| 2012/0330458 A1* | 12/2012 | Weiss .......... B66F 9/063 700/216 |
| 2014/0100999 A1* | 4/2014 | Mountz .......... G06Q 10/087 705/28 |
| 2014/0124462 A1 | 5/2014 | Yamashita |
| 2014/0212257 A1 | 7/2014 | Yamashita |
| 2014/0350717 A1 | 11/2014 | Dagle et al. |
| 2015/0104286 A1 | 4/2015 | Hansl et al. |

FOREIGN PATENT DOCUMENTS

| | | |
|---|---|---|
| DE | 102009032406 A1 | 1/2011 |
| EP | 1486435 A1 | 12/2004 |
| EP | 1964792 A2 | 9/2008 |
| WO | 03064292 A1 | 8/2003 |
| WO | 2015007515 A1 | 1/2015 |

OTHER PUBLICATIONS

Commonly assigned co-pending U.S. Appl. No. 14/797,222, filed Jul. 13, 2015, entitled Picking Station with Automaded Warehouse.

* cited by examiner ically involves a large number of small orders (each containing as few as one item in the order) that are selected from a large number of potential items. Each unique item has a specific inventory identification, known in the industry as a stock-keeping unit (SKU). Each item usually bears an optical code, such as a barcode or radio frequency identification (RFID) tag, which identifies the SKU of the item.

ORDER FULFILLMENT TECHNIQUE

CROSS REFERENCE TO RELATED APPLICATION

This application claims priority from U.S. patent application Ser. No. 62/032,920, filed on Aug. 4, 2014, the disclosure of which is hereby incorporated herein by reference.

BACKGROUND OF THE INVENTION

The present invention is directed to an order fulfillment method and a system for carrying out such method and, in particular, to such method and system that is useful for processing a large number of orders in a relatively short period of time.

Order fulfillment of orders placed over the Internet must take place within a relatively short period of time in order to be commercially competitive. The same could be said for orders received by phone, facsimile, or by the mail based on catalog or television-based merchandizing. Such order fulfillment is known as E-commerce and places demands on an order fulfillment system to meet such obligations. This is compounded by the fact that E-commerce usually involves a large number of small orders (each containing as few as one item in the order) that are selected from a large number of potential items. Each unique item has a specific inventory identification, known in the industry as a stock-keeping unit (SKU). Each item usually bears an optical code, such as a barcode or radio frequency identification (RFID) tag, which identifies the SKU of the item.

Because of the large number of SKUs from which an order may be selected, the inventory warehouse may be very large in footprint. As such, it is common to designate geographic portions of the inventory warehouse to each be picked by an individual picker such that each picker picks only a portion of each order, since each order may be spread out over the entire general footprint of the inventory warehouse. Each picker is directed by a warehouse management system to pick portions of a number of orders using a various picking technology known in the art. It is efficient to have the picker mix several orders in one picking or picked receptacle rather than having multiple receptacles, each bearing one order portion. Also, each order may be contained in a number of picked receptacles if the order contains more than an individual item. However, it is then necessary to subsequently sort the contents of the picked receptacle(s) to the order and to process the items so that they can be packed-out for shipment via courier. Also, orders may be made up of items having various physical characteristics such that some items are not able to be readily handled by a conventional material-handling system.

SUMMARY OF THE INVENTION

The present invention is directed to a technique for fulfilling orders in a manner that conceptually provides for rolling bubbles of order fulfillment. The use of rolling order bubbles allows for better utilization of an automated receptacle storage and delivery system.

A method and apparatus for fulfilling orders with a system having an automated warehouse that is adapted to store a plurality of inventory receptacles, the automated warehouse including a plurality of vehicles that are adapted to storing inventory receptacles and retrieving inventory receptacles and an outbound device, such as a lift, that is adapted to exchanging inventory receptacles between a pick station and the vehicles, according to an aspect of the invention, includes orders of items being received with an order queue. Orders are disbursed from the order queue to a vehicle queue associated with each vehicle. Inventory receptacles are retrieved with the vehicles having items for at least one of the orders. The inventory receptacles are retrieved according to the vehicle queue for that vehicle. Inventory receptacles are deposited by the vehicles to outbound queues, such as lift queues, associated with the outbound device and forwarded from the outbound device to the pick station according to the requirements of the pick station. Items are retrieved from the product receptacles at the pick station and put into transportation receptacles.

The transportation receptacles may be forwarded to secondary processing stations where items are removed from the transportation receptacles and combined with individual orders at the secondary processing stations.

A priority may be designated of the transportation receptacles at the pick station with at least one of said transportation receptacles being designated a primary transportation receptacle and each of the transportation receptacles that is not a primary transportation receptacle being designated a secondary transportation receptacle. The retrieving product receptacles include vehicles retrieving product receptacles having items for the primary transportation receptacle prior to retrieving product receptacles having items for the secondary transportation receptacles. The primary transportation receptacle may be completed at the pick station ahead of the secondary transportation receptacle. A priority may be designated among the secondary transportation receptacles and vehicles may retrieve product receptacles for secondary transportation receptacles according to the priority of those secondary transportation receptacles. The secondary transport receptacle having a highest priority may be moved to the position of the primary transportation receptacle when the previous primary transportation receptacle is complete.

The primary transportation receptacle may be dispatched to a secondary processing station when complete. Each of the transportation receptacles will typically be dispatched to only one of the secondary processing stations.

An order may be designated as a single order if that order includes only one item or one type of item. The retrieving of product receptacles may include retrieving singles product receptacles having a type of item for one of the singles orders. Retrieving of order receptacles from the vehicle queues may include the outbound device retrieving one of the singles product receptacles. Items from singles orders may be put into a singles transportation receptacle that is sent to packing from the pick station when complete.

An order may be designated as a virtual order. A virtual order is assigned a priority that is lower than a priority assigned to any secondary order. A virtual order does not yet have a transportation receptacle assigned to that order at the pick station.

An order may be designated as a hot order. A hot order is assigned a priority that is greater than that of a primary order. A virtual transportation receptacle in the vehicle queue may be replaced with a hot order transportation receptacle. A hot order transportation receptacle is forwarded to the pick station ahead of any virtual order transportation receptacle.

Orders of items may be received at the order queue in response to an order fulfillment position becoming available at one of the secondary processing stations. The fulfillment position may be physical or virtual.

The pick station may be a goods-to-person station and items retrieved by a human operator. The pick station may be a goods-to-robot station and items retrieved by a robot.

These and other objects, advantages and features of this invention will become apparent upon review of the following specification in conjunction with the drawings.

DESCRIPTION OF THE PREFERRED EMBODIMENT

Figure 1:
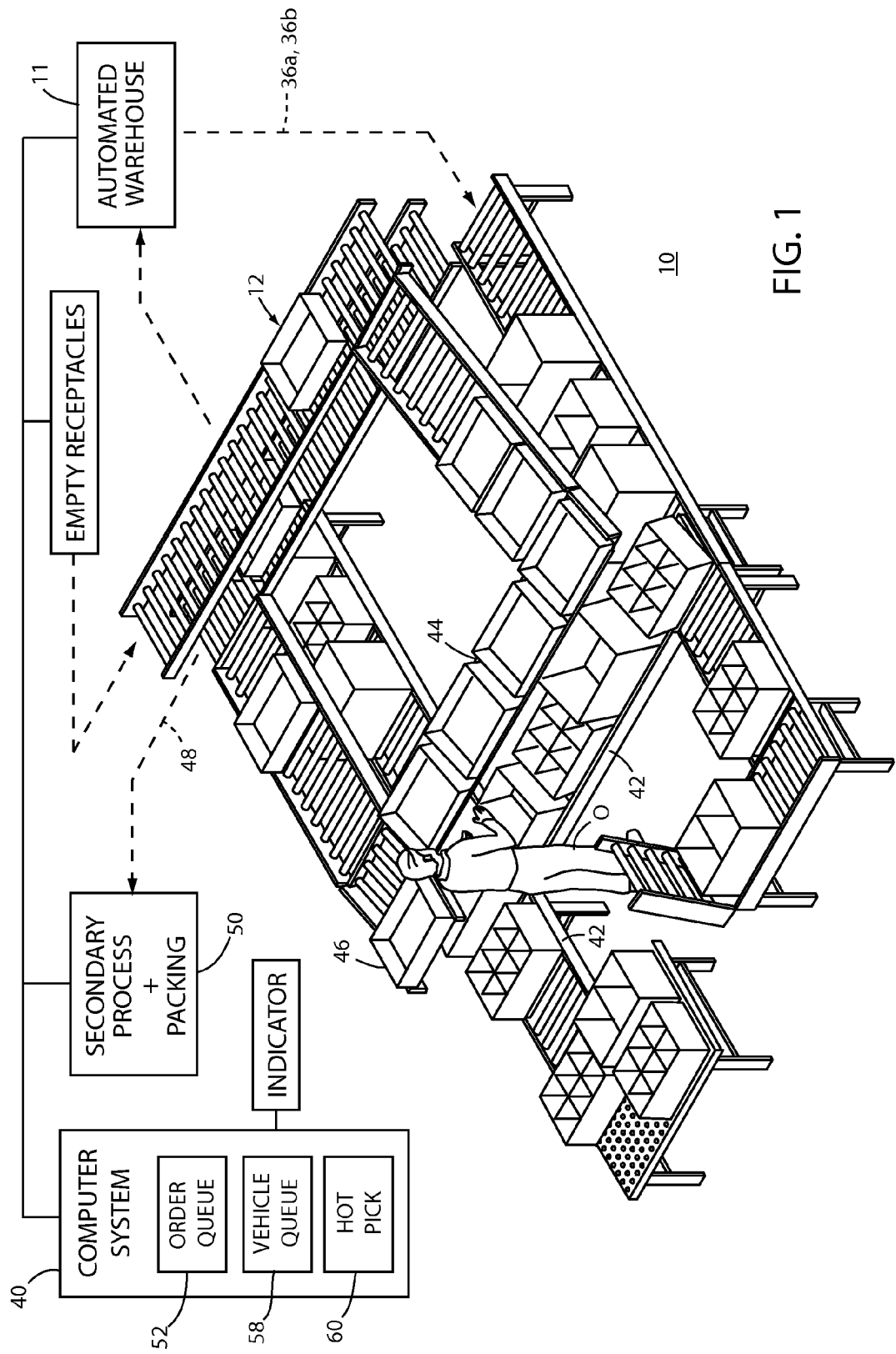
FIG. 1 is a perspective view of an order fulfillment system useful with the invention.

Referring now to the drawings and the illustrative embodiments depicted therein, disclosed herein is an order fulfillment technique that can be carried out using the order fulfillment system and methods disclosed in commonly assigned U.S. patent application Ser. No. 14/797,222, filed Jul. 13, 2015, by the present inventors for a PICKING STATION WITH AUTOMATED WAREHOUSE and Ser. No. 14/755,580, filed Jun. 30, 2015, by Criston S. Stevens for a LIFT CONFIGURATION FOR CARRIAGE-BASED WAREHOUSE, the disclosures of which are hereby incorporated herein by reference in their entireties. For purposes of discussion of the illustrative embodiment, the items for customer orders may be randomly distributed across the field of all possible inventory items, resulting in a subset of items being deliverable to a particular pick station, of which only one is shown herein. Groups of customer order subsets destined to a single pick station are collected in sets for delivery to secondary processing put walls, or consolidation workstations, for consolidation of the individual customer orders. The accumulation of the customer orders destined to a common secondary processing station will be referred to herein as "orders" for simplicity. Also, the term "receptacle" refers to totes, cartons, trays, or any other such item.

Figure 2:
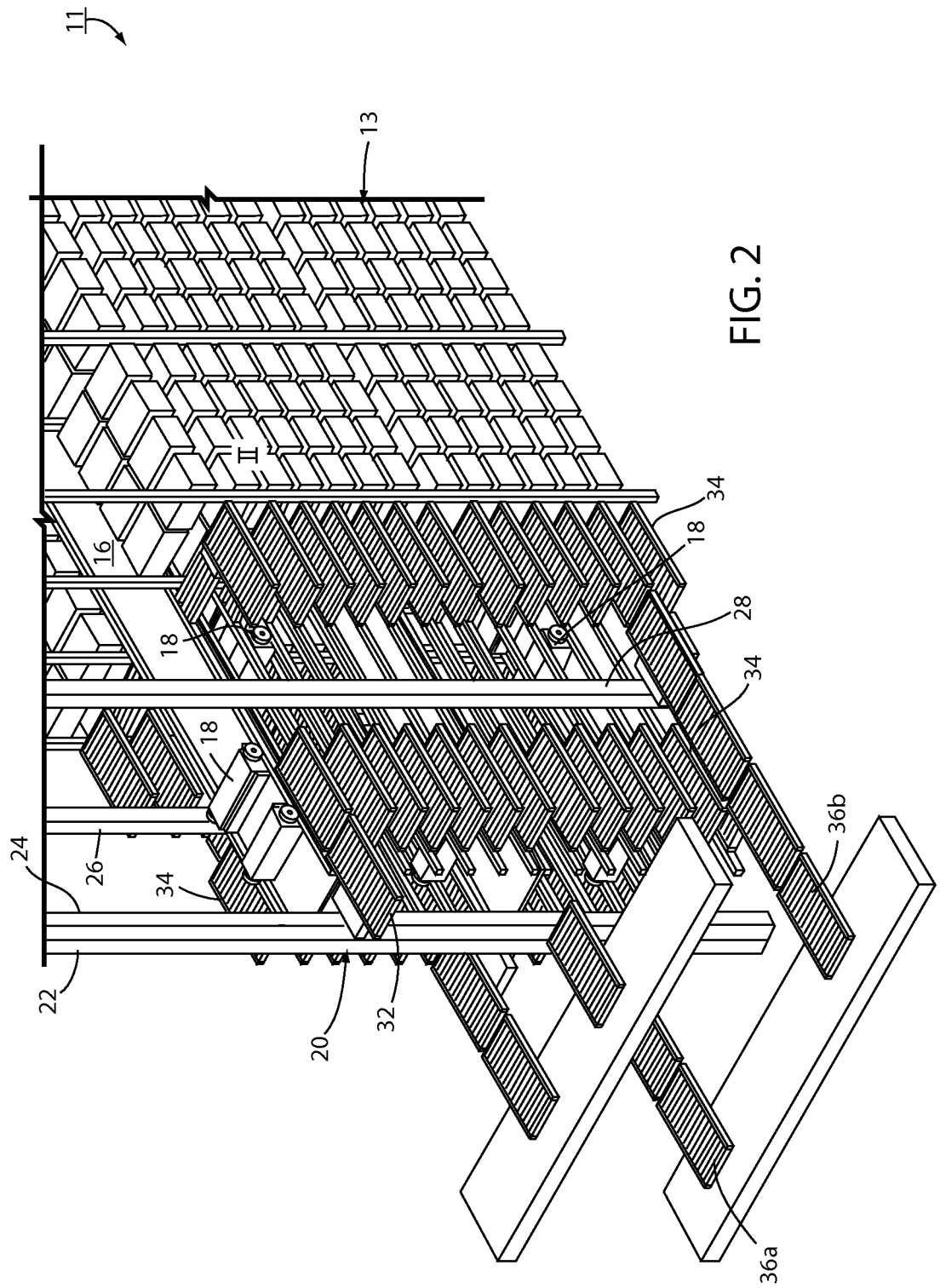
FIG. 2 is a perspective view of an automated warehouse useful with the invention.

In the illustrated embodiment, an order fulfillment system 10 includes an automated warehouse 11 and a pick station 12. Although one of each are illustrated, it should be understood that system 10 may include a number of automated warehouses 11 and pick stations 12. While the details of an automated warehouse system 11 are set forth in detail in the '580 patent application, suffice it to say that an order automated warehouse system 11 has at least two stacked longitudinally extending racks 13 that are laterally separated by an aisle 16 (FIG. 2). Each rack 13 has a plurality of levels 14 with storage locations 15 on each of the levels. A plurality of automated carriages 18 are provided, one at each of levels 14. Automated carriage 18 travels longitudinally along the associated aisle 16 for the level and stores articles to and retrieves articles from storage locations 15 of each of the racks 13 at that level 14. In the illustrated embodiment, each automated carriage 18 is capable of storing articles to and retrieving articles from at least two separate rows of articles in each of racks 13. Each of said rows is at a different distance from aisle 16. An outbound device arrangement, such as a lift arrangement, generally shown at 20 is provided for delivering articles, such as inventory receptacles, to and retrieving articles from the levels 14 of the stacked racks. As will be described in more detail below, lift arrangement 20 is made up of a first lift assembly 22, a second lift assembly 24, a third lift assembly 26 and a fourth lift assembly 28. Since there are four (4) lift assemblies and two (2) racks 12, it can be seen that lift arrangement 20 has more than one lift assembly (22, 24, 26, 28) for each rack 12. Each lift assembly (22, 24, 26, 28) has a vertical mast 30 that extends at least the height of each rack 12 and a lift platform 32 that raises and lowers along mast 30 using conventional techniques. At each level of racks 12, an outbound queue, such as a lift queue 34, provides a buffer for storage of product receptacles in a specific sequence for dispatch to the associated lift assembly 22, 24, 26, 28. Lift queue 34 includes an aisle conveyor 38 that serves as a buffer to hold an article while it is awaiting the lift assembly to pick up that article. In the illustrated embodiment, a pair of access conveyors 36a, 36b are provided at a ground floor level to feed product receptacles and/or receive product receptacles from lift platform 32. It should be understood that the description of automated warehouse 11 is exemplary and other configurations of the automated warehouse may be used.

While the details of pick station 12 are disclosed in detail in the '222 patent application, suffice it to say that access conveyors 36a, 36b are connected with a pick station 12 for supplying product, or inventory, receptacles (FIG. 1). Product receptacles are supplied to automated warehouse 11 from a receiving function (not shown) that receives raw inventory to the warehouse. A computer system 40 provides all of the necessary instructions that coordinates automated warehouse 11 and pick station 12 including an indicator that identifies to an operator O each inventory item that is to be picked from an inventory receptacle at a product receptacle line 42 and placed in a put or transportation receptacle, as well as other instructions. The transportation receptacle may be on a multiple-item-order put line 44 which is adapted to accumulate various items for orders that contain more than one item. The transportation receptacles may be on a singles order put line 46 which is adapted to accumulate various items for orders that contain only one type of item per order.

Transportation receptacles from multiple-item-order put line 44 and singles order put line 46 are merged and dispatched with order output line 48 to secondary process or packing at 50. Secondary process is for multiple-item-order transportation receptacles from line 44 which receives one or more multiple-item-order receptacles for further sortation to individual orders. The secondary process may be a put function, such as a plurality of put walls or other known order accumulation function of the type known in the art. Each transportation receptacle from multiple-item-order put line 44 is intended to go to one and only one secondary put function, but multiple transportation receptacles from put line 44 will go to each secondary put function.

At the secondary function, an operator or a form of automation, such as a robotic arm, will remove each item from the transportation receptacle and identify that item, such as with a barcode scanner or other technique, and computer system 40 will identify the location on the put wall where the order for that item is being assembled. The packing function of 50 is for receipt of singles receptacles from singles order put line 36. Each singles receptacle will typically have a plurality of different types of items and/or multiple quantities of the same type of item, each destined for an individual single item order. Inventory, or product, receptacles are stored in automated warehouse 11 until retrieved under control of computer system 40. Product receptacles may be a plurality of different types based on the inventory items in that product receptacle.

Figure 3:
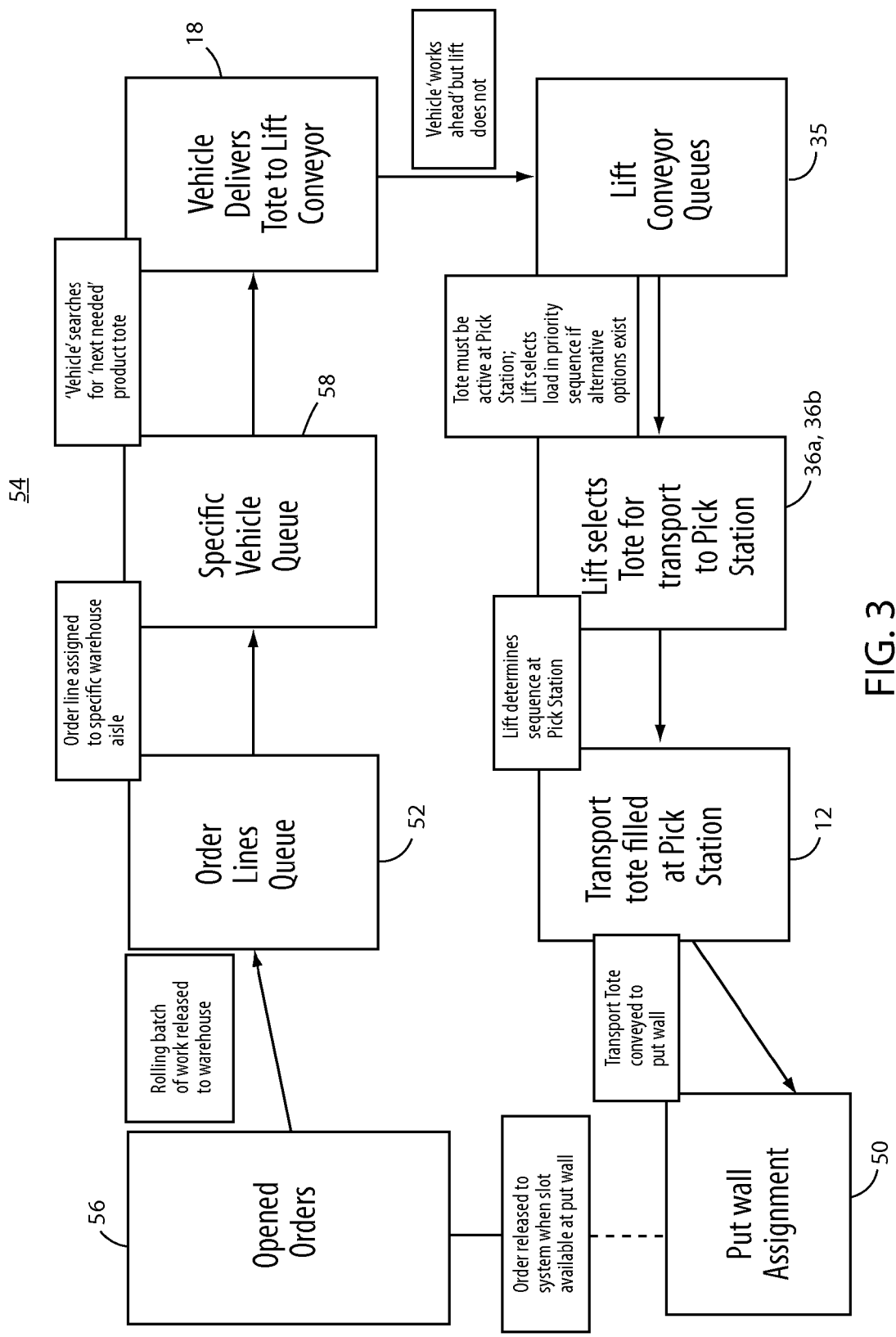
FIG. 3 is a flow diagram of a method of fulfilling orders according to an embodiment of the invention.

Computer system 40 maintains a queue 52 of open orders to be released for fulfillment. The orders are entered by a warehouse management system defined in computer system 40 from customer orders or intra-company warehouse orders and each of the orders include one or more inventory items for that order. Multiple customer orders may be grouped together in real time based upon secondary process station considerations. Thus, while the term "order" may refer to a single order, as used herein, the term "order" may mean the accumulation of customer order line items for the same secondary process station from a particular pick station. Orders may be processed using an order fulfillment technique 54 (FIG. 3).

Figure 4:
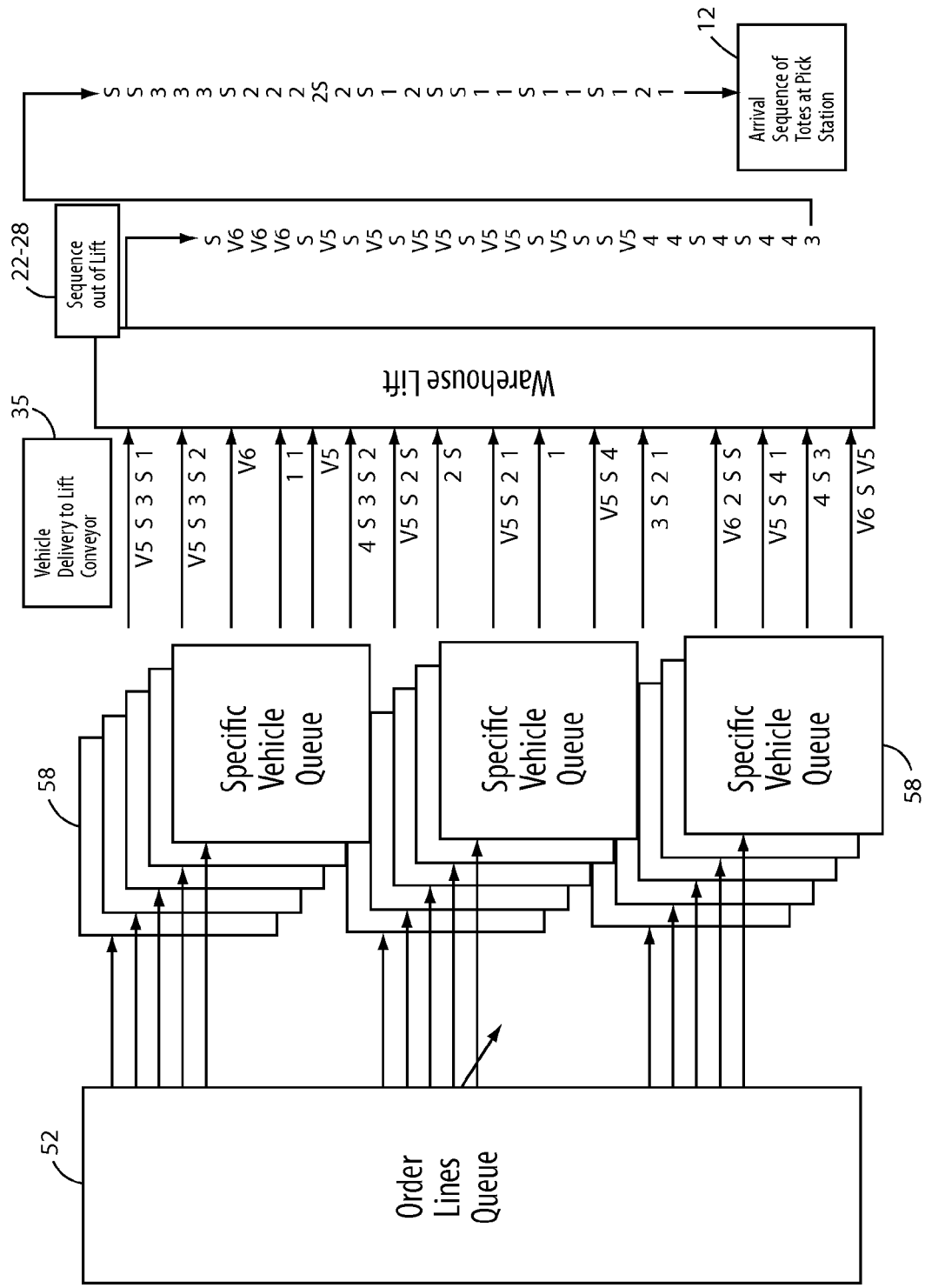
FIG. 4 is a software diagram of the data structures useful with the method in FIG. 1.
Figure 5:
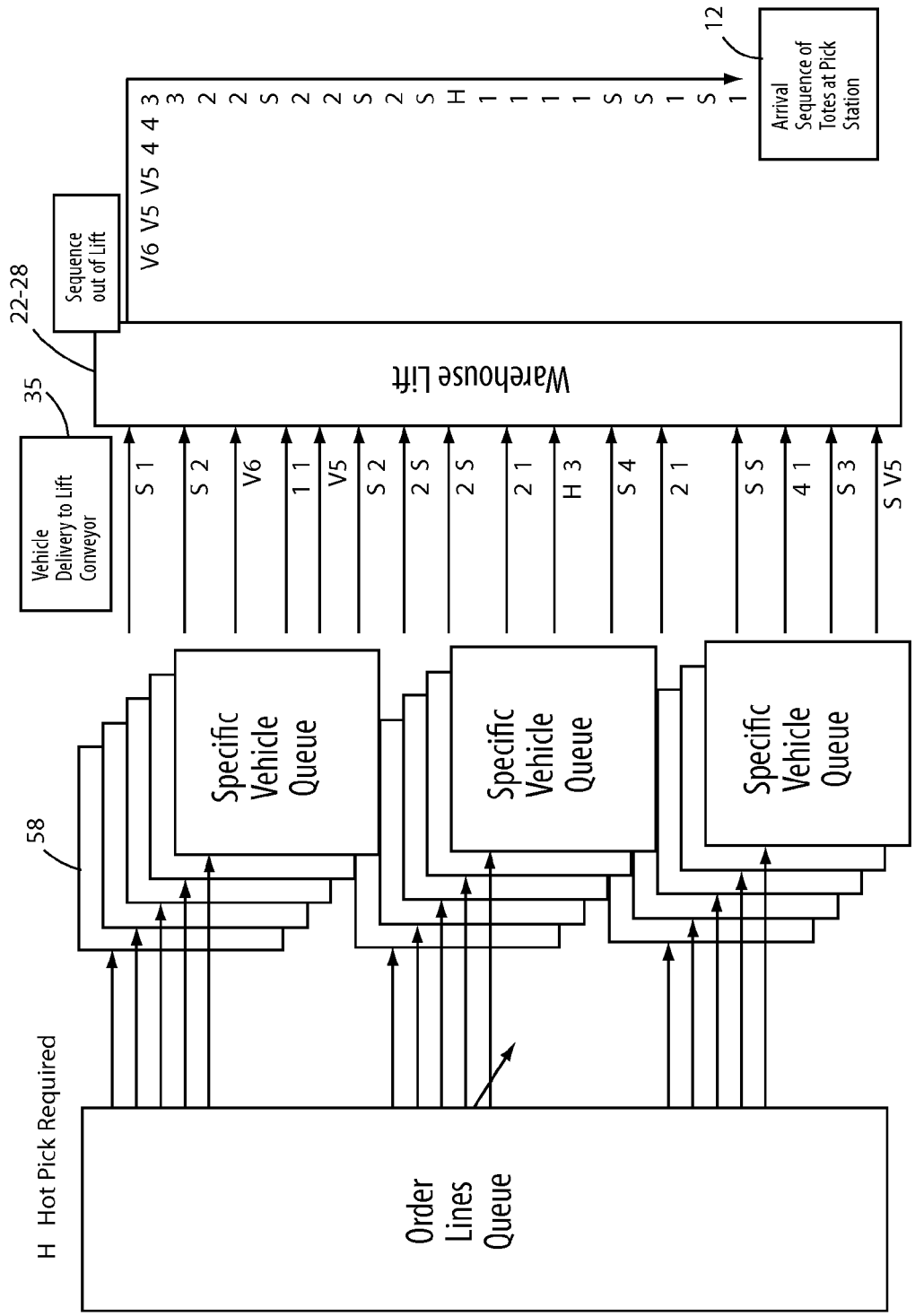
FIG. 5 is the same view as FIG. 2 illustrating a Hot Pick function.
Figure 6:
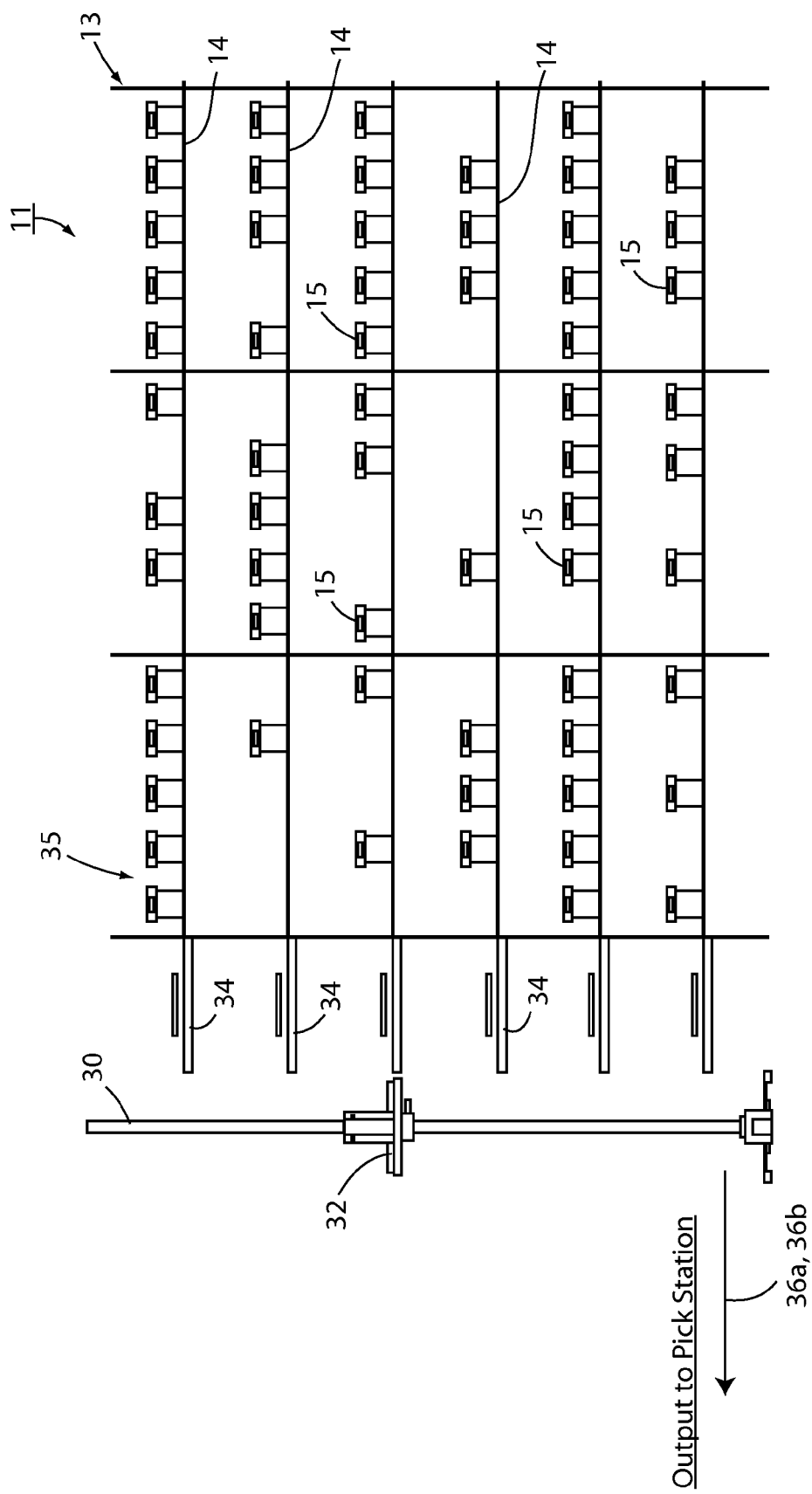
FIG. 6 is a side elevation of the automated warehouse illustrated in FIG. 2.

Opened orders 56 are downloaded to a software system run by computer system 40 and released to the automated warehouse 11 as the order is assigned to a consolidation or virtual slot downstream in one of the secondary order processing stations, such as a put wall 50, in the order fulfillment system. This is represented in FIG. 3 as a dashed line between open order queue 56 and put wall 50. The order is assigned to an order line queue 52. The order lines are disbursed from queue 52 to queues 58, one for each of the multi-shuttle vehicles 18 in the automated storage and delivery system 11. Queue 58 is known as a vehicle queue. The vehicles 18 deliver product receptacles to a set of lift queues 35 defined by aisle conveyors 34 for the respective level of warehouse and rack locations shown in FIG. 6 for future delivery to a pick station. Each lift queue 35 is associated with a lift at one level of the lift system. Lift queue 35 may also include a portion of rack 13 closest to the respective lift as seen in FIG. 6. The inventory receptacles are retained in the queue 35 in the sequence they are deposited by the vehicle and await retrieval by a lift platform of the associated lift 22, 24, 26, 28 for delivery to the pick station 12. The inventory receptacles are deposited in the lift queue 35 according to the sequence of the transportation receptacles (1, 2, 3, 4, etc. as shown in FIGS. 4 and 5) being treated as active transportation receptacles at the pick station for filling, with each of the transportation receptacles receiving portions of customer orders for transportation to secondary processing stations 50.

Inventory receptacles designated as S for singles have one item associated with a single-item type order that are put into a singles transportation receptacle at single order put line 46 at the pick station 12, with the singles transportation receptacle sent to a packing station 50 for dispatching to the customer.

Figure 7:
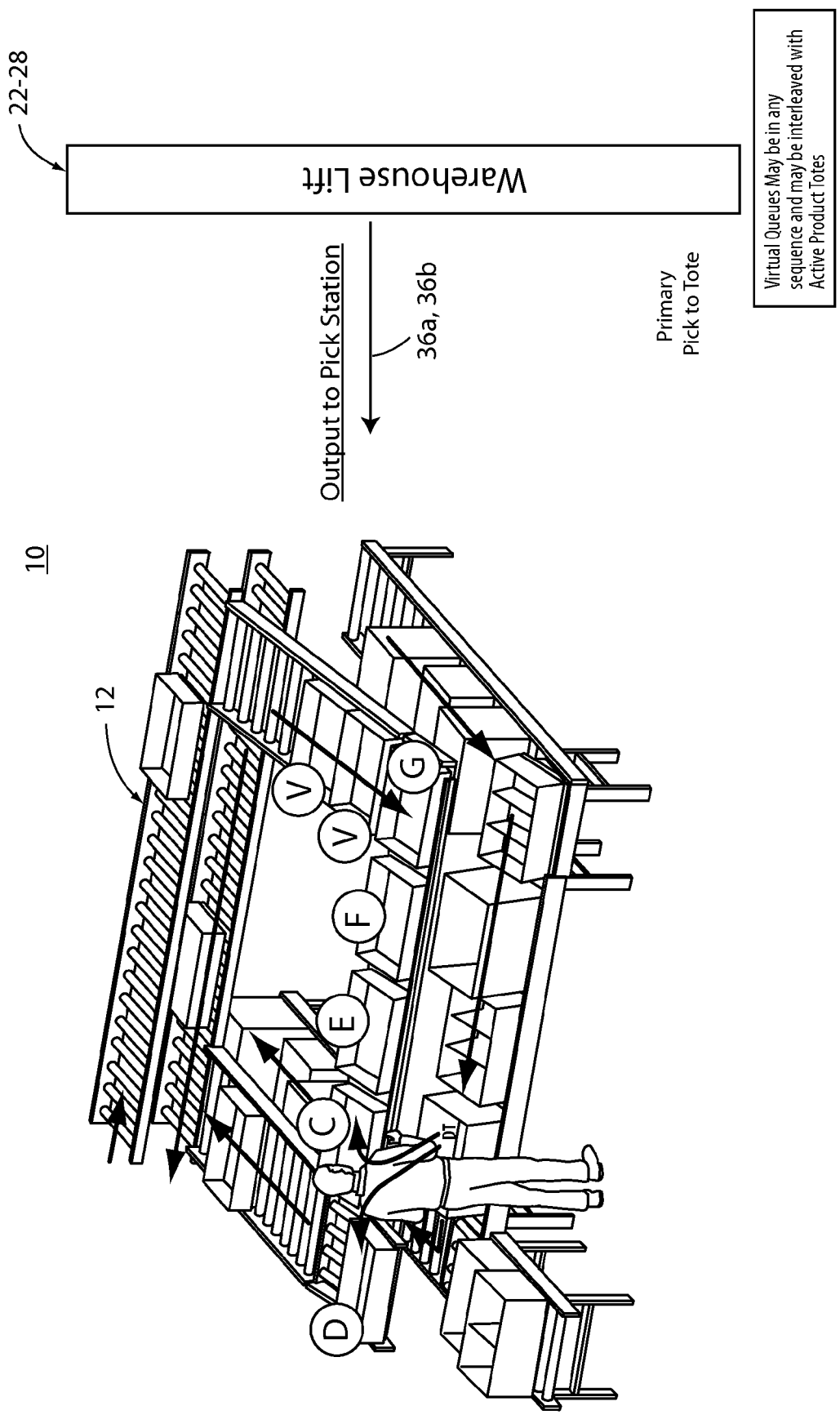
FIG. 7 is a perspective view of a pick station illustrating movement of transportation receptacles through the pick station in FIG. 1.

The pick station 12 has a series of locations at put line 44 that hold transport receptacles for eventual delivery to the order consolidation area, or secondary processing stations 50, of the system. The transport receptacles at the operator station are called "active" transport receptacles (C, D, E, F, and G) and are shown in FIG. 7. The software of computer system 40 directs the vehicles to at least initially select inventory receptacles for delivery to the pick operator at station 12 that provides product that is required in one or more of several transportation receptacles available to the operator at put line 54, 56. The preferred selection of inventory receptacles by the software for the vehicle 18 is for the inventory receptacles containing product needed for a "primary" transportation receptacle (C) or the "singles" transportation receptacle (D) as shown in FIG. 7. The operator has access to a "secondary" transportation receptacle (E), "tertiary" receptacle (F), "quaternary" receptacle (G), and so on as room allows at the pick station 12. Inventory receptacles containing material for singles orders are used as filler work to give the automated warehouse 11 time to deliver as many of the product receptacles as possible for the primary transportation receptacle (C) before delivering inventory receptacles for an alternate transportation receptacle (E, F, G). If work is not available for the "primary" transportation receptacle (C), the software selects a product receptacle for the "secondary" transportation receptacle (E). If none is available for the "secondary" transportation receptacle (C), an attempt is made for the "tertiary" transport receptacle (F) and so on until the pick transportation receptacle locations at the pick workstation are exhausted.

In order to keep the multi-shuttle vehicles 18 working at a high capacity, the software then searches for inventory receptacles for a number of "virtual" transportation receptacles (V). Inventory receptacles designated V are virtual orders that are not yet active because they do not have an item designed for one of the active transportation receptacles as set forth below. Such virtual transportation receptacles are designated by the prefix V in FIG. 4. Virtual receptacles are assembled by the software and passed on for work to the vehicles 18 until a variable limit is reached. While vehicles 18 are allowed to work ahead on "virtual" transportation receptacles, those inventory receptacles are queued by the vehicle queue 58 and not allowed to be processed to the lift queue 35 for delivery to the pick station. This decoupling of the vehicles 18 from the lifts 22, 24, 26, 28 allows the vehicles to continue working at a high level of utilization, but ensures that product receptacles that arrive at the pick station 12 contain product that the operator can process into the transport receptacles that are accessible by the operator at the pick station.

As the operator of station 12 completes the picks required by the primary transportation receptacle (C), the primary transportation receptacle is removed from the pick workstation by discharge to a transport conveyor 48, or the like, for delivery to the order consolidation area 50, such as a put wall. If an alternate transportation receptacle (E, F, G) is completed before the primary (C), it will wait until the primary transportation receptacle is discharged before moving out of the pick station 12. This leaves room at the pick station for each of the transport receptacles to shift positions. As the secondary transportation receptacle (E) shifts into the primary location (C), tertiary receptacles (F) move to the prior position of the secondary receptacle (E), the quaternary receptacle (G) moves to the tertiary location (F), and so on allowing the "first" virtual transportation receptacle (V) to move into the last active location at the pick station. The inventory receptacles required for this newly active transportation receptacle are now available to the lift queue for delivery to the pick workstation for processing. In other words, the required inventory receptacles for the new active transportation receptacles "roll" into the active buffer for the pick station. While the invention is illustrated with a pick station 12 having a human operator in a goods-to-person operation, it may also be used with a pick station having a robotic operator in a goods-to-robot operation as illustrated in commonly assigned U.S. patent application Ser. No. 62/120,572, filed Feb. 25, 2015, by Franklin et al. for an AUTOMATED ORDER FULFILLMENT SYSTEM AND METHOD, the disclosure of which is hereby incorporated by reference in its entirety.

The present order fulfillment technique includes mechanisms 60 to allow priority product receptacles, designated "Hot Picks" to skip ahead of already queued inventory receptacles needed only for virtual transportation receptacles (H). By comparison of FIGS. 4 and 5, when a Hot Pick is required, the order is dispatched to the vehicle queue. In the illustration in FIG. 5, the Hot Pick (H) is shown in relation to the centermost vehicle queue (B) having had a virtual transportation receptacle. The inventory receptacle for the virtual transportation receptacle (not shown) is retracted and the inventory receptacles for the Hot Pick transportation receptacle H placed in its stead. The inventory receptacles for the Hot Pick transportation receptacle (H) is then retrieved by the lift after all active order transportation receptacles are retrieved by the lift 22, 24, 26, 28. In the embodiment illustrated in FIG. 5, the only inventory receptacles retrieved before those of the Hot Pick are those needed for transportation receptacle "1" or currently assigned transportation receptacles "2", "3", or "4". That is because there are no inventory receptacles for other active transportation receptacles ahead of the Hot Pick. Once the inventory receptacles for active transportation receptacles are processed, the inventory receptacles needed to process the Hot Pick transportation receptacle will be retrieved by the lift 22, 24, 26, 28. This use of active transportation receptacles, virtual transportation receptacles and Hot Pick transportation receptacles facilitates processing of priority orders that must be fulfilled out of sequence.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of fulfilling orders with a system having an automated warehouse that is adapted to store a plurality of inventory receptacles, said automated warehouse including a plurality of vehicles and an outbound device, said vehicles storing inventory receptacles and retrieving inventory receptacles, said outbound device adapted to exchanging inventory receptacles between the vehicles and at least one pick station, said method comprising:
   receiving orders of items with an order queue;
   disbursing orders from said order queue to a plurality of vehicle queues, each associated with one of said vehicles, each said vehicle queue capable of storing the identity of inventory receptacles for certain of the orders;
   retrieving inventory receptacles with said vehicles having items for at least one of the orders according to the vehicle queue for that vehicle;
   said vehicles transporting inventory receptacles to an outbound queue associated with said lift;
   forwarding the inventory receptacles from said outbound queue with said outbound device to the pick station according to the requirements of the pick station; and
   retrieving items from the inventory receptacles at said pick station and putting the items into transportation receptacles.

2. The method as claimed in claim 1 including forwarding the transportation receptacles to a secondary processing station.

3. The method as claimed in claim 2 including removing the items from the transportation receptacles at said secondary processing station and combining the items with individual orders at said secondary processing station.

4. The method as claimed in claim 1 wherein the receiving orders of items with the order queue includes designating a priority of the transportation receptacles at said pick station with at least one of said transportation receptacles being designated a primary transportation receptacle and each of the transportation receptacles that is not a primary transportation receptacle being designated a secondary transportation receptacle, wherein said retrieving inventory receptacles comprises said vehicles retrieving inventory receptacles having items for said primary transportation receptacle prior to retrieving inventory receptacles having items for said secondary transportation receptacles.

5. The method as claimed in claim 4 wherein the primary transportation receptacle is completed at said pick station ahead of the secondary transportation receptacles.

6. The method as claimed in claim 4 including designating a priority among the secondary transportation receptacles and wherein said retrieving inventory receptacles comprises said vehicles retrieving inventory receptacles for secondary transportation receptacles according to the priority of those secondary transportation receptacles.

7. The method as claimed in claim 6 including moving the secondary transportation receptacle having a highest priority to the position of the primary transportation receptacle when the previous primary transportation receptacle is complete.

8. The method as claimed in claim 7 including dispatching the primary transportation receptacle to a secondary processing station when complete.

9. The method as claimed in claim 8 including dispatching each of said transportation receptacles to only one of said secondary processing stations.

10. The method as claimed in 1 wherein said order queue designates an order as a single if that order includes only one item.

11. The method as claimed in claim 10 wherein said disbursing of orders includes disbursing singles orders and wherein said retrieving inventory receptacles includes retrieving singles inventory receptacles having a type of item for one of the singles orders.

12. The method as claimed in claim 11 wherein said retrieving order receptacles from said outbound queues with said outbound device includes retrieving one of the singles inventory receptacles.

13. The method as claimed in claim 12 wherein items from singles orders are put into a singles transportation receptacle that is sent to packing from said pick station when complete.

14. The method as claimed in claim 4 wherein the receiving of orders with the order queue includes selectively designating an order as a virtual order wherein a virtual order is assigned a priority that is lower than a priority assigned to any secondary order wherein a virtual order does not initially have a transportation receptacle assigned to that order at said pick station.

15. The method as claimed in claim 14 wherein said receiving orders at the order queue includes selectively designating an order as a hot order that is assigned a priority that is greater than that of a primary order.

16. The method as claimed in claim 15 wherein said disbursing orders from said order queue to a vehicle queue includes replacing a virtual inventory receptacle in said vehicle queue with a hot order transportation receptacle, wherein a hot order inventory receptacle is forwarded to said pick station ahead of a virtual order inventory receptacle.

17. The method as claimed in claim 1 wherein said receiving orders of items with an order queue is in response to an order fulfillment position becoming available at one of said secondary processing stations.

18. The method as claimed in claim 17 wherein the order fulfillment position is physical or virtual.

19. The method as claimed in claim 1 wherein said pick station comprises a goods-to-person station and said retrieving items is by a human operator.

20. The method as claimed in claim 4 wherein said receiving orders at the order queue includes selectively designating an order as a hot order that is assigned a priority that is greater than that of a primary order.

21. An order fulfillment system, comprising:
- at least one pick station that receives product receptacles and dispatches transportation receptacles, wherein items are retrieved from said product receptacles and placed in said transportation receptacles at said at least one pick station;
- an automated warehouse adapted to store a plurality of inventory receptacles and having a plurality of vehicles and an outbound device, each of said vehicles adapted to storing inventory receptacles and retrieving inventory receptacles, said outbound device is adapted to exchanging inventory receptacles between the vehicles and said at least one pick station;
- a computer system defining an order queue and supplying said order queue with a plurality of orders of items;
- a plurality of vehicle queues, each associated with one of said vehicles, each of said vehicle queues capable of storing the identity of multiple inventory receptacles for certain of the orders;
- said computer system controls said automated warehouse to retrieve inventory receptacles with said vehicles, wherein each of the inventory receptacles has items for at least one of the orders and the vehicles each depositing the retrieved inventory receptacles to the outbound queue associated with that lift; and
- said computer system causing said outbound device to retrieving inventory receptacles from said outbound queue and forwarding the inventory receptacles from said outbound queues to the pick station according to requirements of the pick station; and
- said computer system directs retrieving of items from product receptacles at the pick station and putting the items into transportation receptacles.

* * * * *